United States Patent
Campbell (10) Patent No.: US 10,031,314 B2
(45) Date of Patent: *Jul. 24, 2018

(54) PRISM-BASED FOCAL PLANE ADJUSTMENT FOR THERMAL COMPENSATION IN A LENS ASSEMBLY

(71) Applicant: GoPro, Inc., San Mateo, CA (US)

(72) Inventor: Scott Patrick Campbell, Belmont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,235

(22) Filed: Apr. 24, 2017

(65) Prior Publication Data

US 2017/0227730 A1  Aug. 10, 2017

Related U.S. Application Data

(63) Continuation of application No. 15/233,935, filed on Aug. 10, 2016, now Pat. No. 9,664,877.

(60) Provisional application No. 62/205,600, filed on Aug. 14, 2015.

(51) Int. Cl.
| | |
|---|---|
| *G02B 7/09* | (2006.01) |
| *G02B 7/18* | (2006.01) |
| *G03B 17/12* | (2006.01) |
| *G02B 7/00* | (2006.01) |
| *G02B 7/02* | (2006.01) |

(52) U.S. Cl.
CPC ............. *G02B 7/008* (2013.01); *G02B 7/028* (2013.01); *G02B 7/181* (2013.01); *G02B 7/1805* (2013.01); *G03B 17/12* (2013.01)

(58) Field of Classification Search
None
See application file for complete search history.

(56) References Cited

U.S. PATENT DOCUMENTS

| | | | |
|---|---|---|---|
| 9,664,877 B2 * | 5/2017 | Campbell | G02B 7/181 |
| 2005/0232619 A1 | 10/2005 | Yamamoto | |
| 2007/0070228 A1 | 3/2007 | Lee | |
| 2012/0020655 A1 | 1/2012 | Pao | |
| 2012/0063760 A1 | 3/2012 | Wetherell et al. | |
| 2017/0031128 A1 * | 2/2017 | Liu | H04N 5/232 |
| 2017/0059807 A1 * | 3/2017 | Feng | G02B 7/028 |
| 2017/0227730 A1 * | 8/2017 | Campbell | G02B 7/008 |

* cited by examiner

*Primary Examiner* — W B Perkey
(74) *Attorney, Agent, or Firm* — Young Basile Hanlon & MacFarlane, P.C.

(57) ABSTRACT

To compensate for a focal plane shifting away from an image plane due to a temperature change, an integrated image sensor and lens assembly includes an optical component and an optics compensator including passively actuating elements. The passively actuating elements couple the optical component to the inner surface of the lens mount. The passively actuating elements and the optics component are configured such that the focal plane is maintained to coincide with or substantially coincide with the image plane. The passively actuating elements and the optics component adjust the distance an incident ray travels in the optics compensator when the temperature changes to thereby maintaining the focal plane to coincide with or substantially coincide with the image plane.

20 Claims, 6 Drawing Sheets

PRISM-BASED FOCAL PLANE ADJUSTMENT FOR THERMAL COMPENSATION IN A LENS ASSEMBLY

CROSS REFERENCE TO RELATED APPLICATION(S)

This application is a continuation of and claims the benefit of U.S. application Ser. No. 15/233,935, filed Aug. 10, 2016, now U.S. Pat. No. 9,664,877, which claims the benefit of U.S. Provisional Patent Application Ser. No. 62/205,600, "Prism-Based Focal Plane Adjustment for Thermal Compensation in a Lens Assembly," filed Aug. 14, 2015, each of which is incorporated herein by reference in its entirety.

BACKGROUND

Technical Field

This disclosure relates to a camera, and more specifically, to an integrated sensor and lens assembly of a camera.

Description of the Related Art

Manufacturing of lens assemblies for high-resolution cameras typically require a high degree of precision in positioning components of the lens assembly to ensure that the lens will achieve proper focus. As a result, a challenge exists in achieving a fast, automated, and high-yielding assembly process for high-resolution cameras.

In an integrated image sensor and camera lens system, a lens mount is coupled to a lens barrel. In an assembly process, a lens barrel housing the camera lens (or multiple lenses) is placed within a housing assembly affixed to an image sensor such that the image sensor is properly aligned with the lens to maintain lens focus. Upon testing the lens barrel to position it for proper alignment, the lens barrel is affixed to the housing assembly. Imaging lenses tend to defocus during temperature change due to many factors. For example, coefficient of thermal expansion (CTE) changes the physical scale in materials. CTE changes may cause the lens system to move. An individual lens may move with respect to one another and alter the physical dimensions of the lens. In addition, thermo-optic coefficient changes the refractive index of optical materials. Thermal expansion of lens assemblies cause changes in optical path lengths, which defocuses images when a camera is used in a temperature range other than the one under which the camera has been tuned. This affects the focus of the lenses and compromises performance and yield. This effect is especially detrimental to a high definition camera as the sensor is able to resolve details at the very limit of the optical focus and any defocusing is readily captured and appreciably degrades the picture quality.

BRIEF DESCRIPTION OF THE DRAWINGS

The teachings of the present disclosure can be readily understood by considering the following detailed description in conjunction with the accompanying drawings.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

An integrated image sensor and lens assembly comprises a lens barrel holding one or more lenses coupled to a lens mount. The lens mount may be further coupled to an image sensor substrate that has an image sensor lying on an image plane. During an assembly process, the optical distance between the camera lens and the image sensor may be tuned such that the focal plane of the camera lens coincides with the image plane. However, in operation, due to thermal expansion of the lens barrel and the lens mount, the optical distance between the lens window and the image sensor may vary with temperature change thereby causing the focal plane of the camera lens to shift from the image plane. To compensate for the focal plane moving away from the image plane due to a temperature change, the integrated image sensor and lens assembly may further comprise an optics compensator including passively actuating elements and an optical component. The passively actuating elements couple the optical component to the inner surface of the lens mount. The passively actuating elements and the optics component are configured such that the focal plane is maintained to coincide with or substantially coincide with the image plane. As described herein, substantially coincide with refers to a distance between the focal plane and the image plane being within a predefined distance or tolerance that would be acceptable to those skilled in art. In various embodiments, the predefined tolerance can be, for example, a 1% tolerance, a 2% tolerance, a 5% tolerance, etc. The passively actuating elements and the optics component may adjust the distance an incident ray travels in the optics compensator when the temperature changes thereby maintaining the focal plane coincide with or substantially coincide with the image plane.

Figure 1:
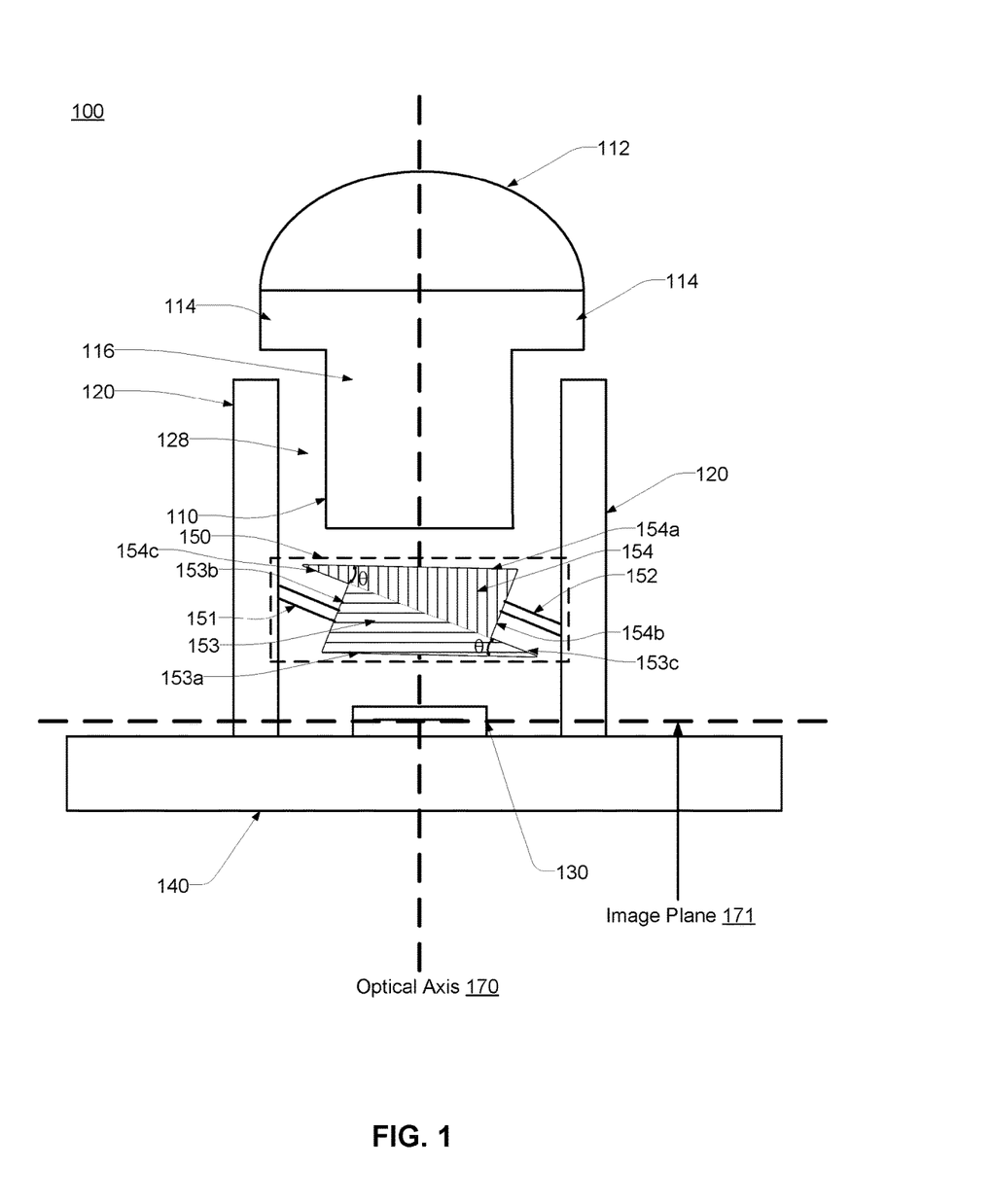
FIG. 1 illustrates an exploded cross-sectional view of an example integrated image sensor and lens assembly, according to one embodiment.

FIG. 1 illustrates an exploded cross-sectional view of an embodiment of an integrated image sensor and lens assembly 100 that includes a camera lens barrel 110, a camera lens mount 120, an optics compensator 150, and an image sensor substrate 140. The optics compensator 150 includes passively actuating elements 151-152 and prisms 153-154. The image sensor substrate 140 has an image sensor assembly 130 (e.g., a high-definition image sensor) for capturing images and/or video. The camera lens mount 120 is physically affixed to the image sensor substrate 140 and also affixed to the camera lens barrel 110.

The lens barrel 110 comprises one or more lenses or other optical components to direct light to the image sensor assembly. The lens barrel 110 comprises a lower portion 116, one or more barrel arms 114, and a lens window 112. The lower portion 116 of the lens barrel is substantially cylindrical and structured to at least partially extend into the channel of the tube portion 128 of the camera lens mount 120. The barrel arms 114 extend radially from the body of the lens barrel 110 and are outside the channel of the lens mount 120 when assembled. The lens arms 114 may be used to physically couple the lens barrel 110 to the camera body (not shown). The lens window 112 includes optical components to enable external light to enter the lens barrel 110 and be directed to the image sensor assembly 130. The camera lens mount 120 includes a tube portion 128 that extends away from the image sensor assembly along the optical axis 170 and includes a substantially cylindrical channel for receiving the lens barrel 110.

The image sensor substrate 140 comprises a printed circuit board for mounting the image sensor assembly 130 and may furthermore include various electronic components that operate with the image sensor assembly 130 or provide external connections to other components of the camera system. The image sensor assembly 130 houses an image sensor (e.g., a high-definition image sensor) for capturing images and/or video and includes structural elements for physically coupling the image sensor assembly 130 to the image sensor substrate 140 and to the camera lens mount 120. The image sensor of the image sensor assembly 130 lies on an image plane 171. The combined focal plane of the lens window 112 and lenses internal to the lens barrel 116 is maintained to coincide with the image plane 171.

The optics compensator 160 compensates for changes in the position of the focal plane (which results in a defocused image) caused by thermal expansion of the lens barrel 110 and/or lens mount 120. In one embodiment, the optics compensator 150 comprises a pair of passively actuating elements 151-152 coupling between an inner surface of the lens mount 120 and a pair of glass prisms 153-154 arranged in a Babinet-Soleil configuration. The prisms 153, 154 may be identical in shape but oriented differently within the lens mount. As illustrated, the prisms 153, 154 each have an angle θ between a horizontal and a plane corresponding to the contact surfaces of the prisms 153, 154. The prisms 153, 154 intersect the optical axis 170. The prisms 153, 154 may be configured such that, in an original or neutral position, the prisms 153, 154 may collectively have a baseline thickness along the optical axis 170. The prisms 153, 154 may be configured such that surfaces 153a, 153b, and 153c of the prism 153 are parallel to surfaces 154a, 154b, and 154c of the prism 154, respectively. The surface 153c of the prism 153 contacts or is in close proximity to the surface 154c of the prisms 154. The prisms 153 and 154 may be configured to move relative to each other such that the net thickness along the optical axis 170 can be varied. In one embodiment, the prisms 153-154 each may be of a geometry such that the optical path between the lens window 112 and the image sensor assembly 130 can be tuned in a predetermined range (e.g., 100 micrometers (ums)) with respect to free space over the range of prism displacement from the neutral or original position. The prisms 153-154 may each have a refractive index and dimensions that change the optical path by a difference as compared to with free space when in a neutral position.

The actuating element 151 (or 152) may couple the prism 153 (or 154) to the inner surface of the lens mount 120 such that the expansion or contraction of the actuating element 151 (or 152) may cause the prism 153 (or 154) to move in a direction that the prisms are configured to move. For example, this direction is parallel to or substantially parallel to the surfaces 153c, 154c of the prisms 153, 154. In one embodiment, the one or more passively actuating elements 151-152 may each comprise a pushrod oriented parallel to or substantially parallel to the direction that the prisms are configured to move. The passively actuating elements 151-152 may be made of a material which has a coefficient of thermal expansion that is the same or substantially the same (or linearly related) as that of the lens barrel 110. As described herein, substantially the same refers to the difference between the coefficient of thermal expansion of the material of the passively actuating elements and that of the lens barrel being within a predefined tolerance that would be acceptable to those skilled in art. In various embodiments, the predefined tolerance can be, for example, a 1% tolerance, a 2% tolerance, a 5% tolerance, etc. Thus, thermal expansion or contraction of the lens barrel 110 due to changes in temperature will cause the pushrods to expand or contract by a similar rate. Decreasing temperature may cause the pushrods to contract, thereby pulling the prisms 153-154 apart and decreasing the overall thickness of the optics compensator 150 at the intersection of the optical axis 170. Increasing temperature may cause the pushrods to expand, thereby pushing the prisms 153-154 together and increasing the overall thickness of the glass at the intersection of the optical axis 170. Due to the refractive index of the glass, the focal plane may adjust in a direction opposite to the direction the focal plane moves due to thermal expansion of the lens barrel 110, thereby compensating for the thermal effects. That is, an increase in thickness of the glass caused by thermal expansion from an increase in temperature may cause the focal length to increase by approximately the same amount as the focal plane moves above the image plane 171 caused by thermal expansion of the lens barrel 110 and a lens mount 120 resulting from the same increase in temperature. Similarly, a decrease in thickness of the glass caused by thermal contraction from a decrease in temperature causes the focal length to decrease by approximately the same amount as the focal plane moves below the image plane 171 caused by thermal expansion of the lens barrel 110 and a lens mount 120 from resulting the same decrease in temperature. For example, the passively actuating elements 151-152 may be shaped such that to provide a displacement of predetermined range (e.g., 40 um) over a predetermined temperature range (e.g., from −45° C. to 85° C.)

Figure 2A:
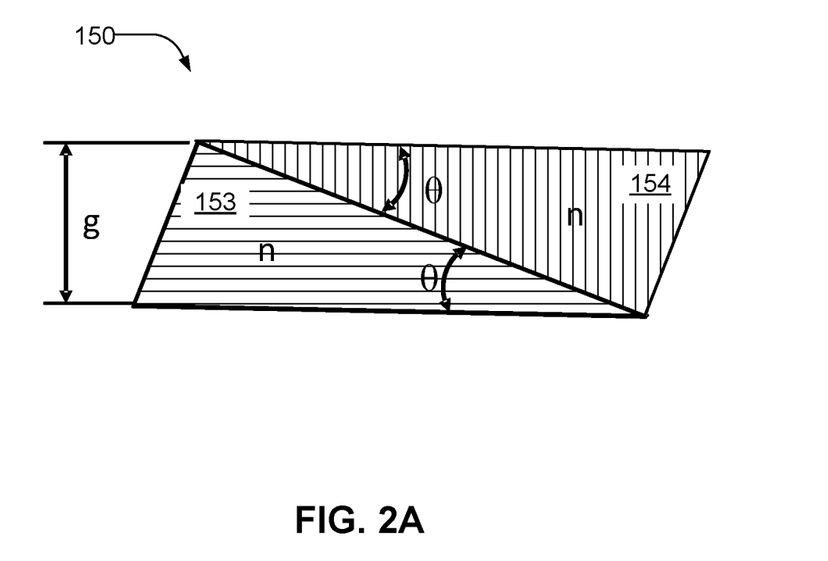
FIGS. 2A-2B illustrate different states of an example pair of prisms, according to one embodiment.
Figure 2B:
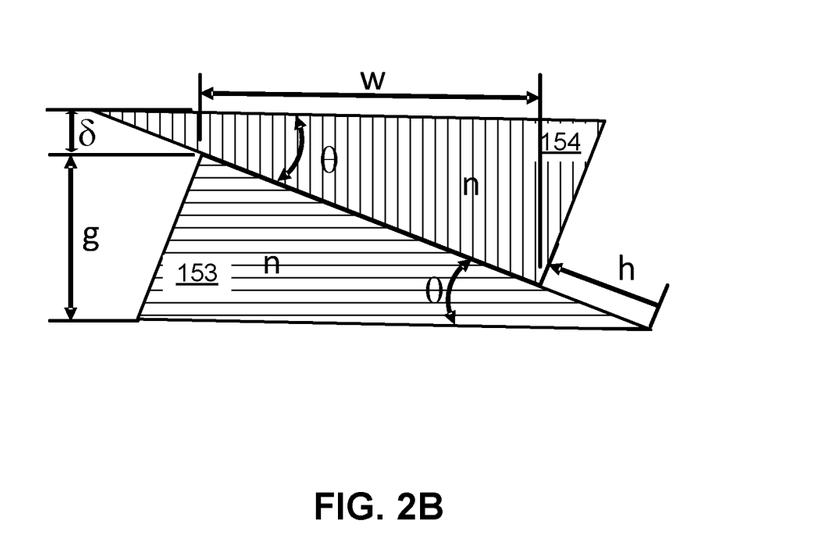

FIGS. 2A-2B illustrate different states of an example pair of prisms 153 and 154. The prisms 153, 154 may be in contact with or in close proximity to each other. FIG. 2A illustrates the prisms 153, 154 in a first state, and FIG. 2B illustrates the prisms 153, 154 in a second state where the prisms 153, 154 are shifted with respect to each other relative to the first state. The combined thickness of the prisms 153, 154 along the optical axis in the first state is g, and the combined thickness of the prisms 153, 154 along the optical axis in the second state is (g+δ) given by Equation (1):

$$g+\delta = g + h \cdot \sin\theta \qquad (1),$$

where h is the relative change in position of the prisms 153, 154, and θ is an angle of the prisms 153, 154. The change in the focal plane ϕ as a result of the prism shift may be determined according to Equation (2):

$$\phi = (h \cdot \sin\theta) \cdot \left(1 - \frac{1}{n}\right), \quad (2)$$

where n is the refractive index of the prisms 153, 154.

Figure 3:
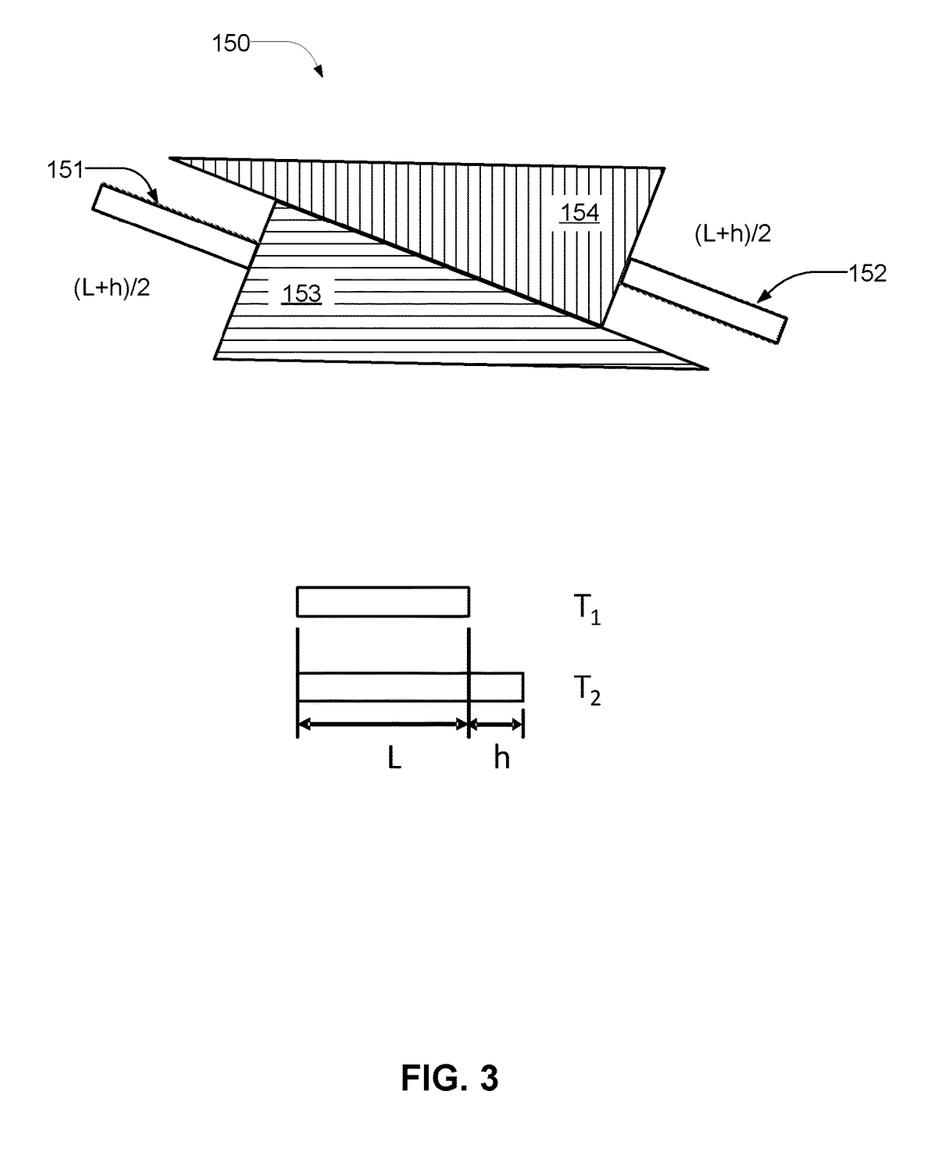
FIG. 3 illustrates an example optics compensator including prisms and pushrods, according to one embodiment.

FIG. 3 illustrates an example optics compensator 150 including prisms 153, 154, each of which is coupled to a respective pushrod 151, 152. The pushrods 151 and 152 each have a length of L/2 and the total length of the pushrods 151 and 152 is L when the temperature is T1. The pushrods 151, 152 are made of a material that expands as temperature increases. For example, when the temperature increases from T1 to T2, the total length of the pushrods 151, 152 increases to (L+h). The increase in length applies a force to the prisms 153, 154 and causes the prisms 153, 154 to shift a distance h relative to each other. Accordingly, the change in the focal plane as a result of the prism shift may be determined according to Equation (3):

$$\phi = (CTE_1 \cdot L \cdot [T_2 - T_1] \cdot \sin\theta) \cdot \left(1 - \frac{1}{n}\right), \quad (3)$$

where $CTE_1$ is the coefficient of thermal expansion of the pushrods 151, 152.

Figure 4:
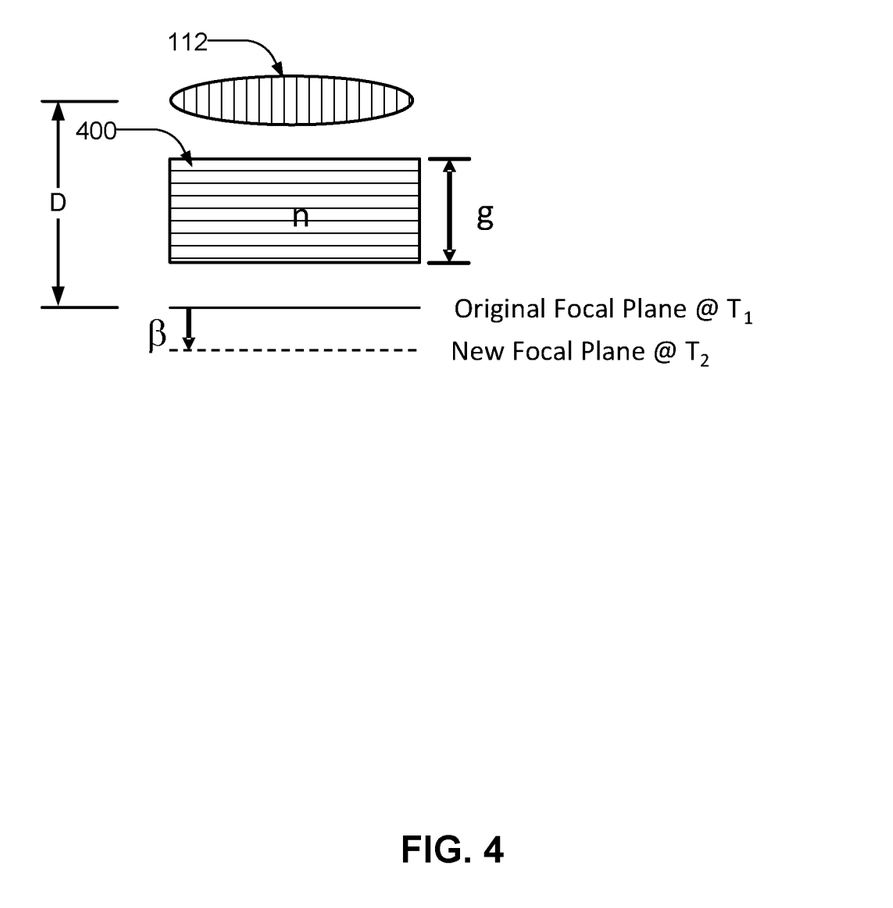
FIG. 4 illustrates a change in focal plane position resulting from a change in the thickness of the prisms, according to one embodiment.

FIG. 4 illustrates a change in focal plane position resulting from a change in the thickness of the prisms 153, 154 due to temperature change. Changes in temperature may also cause the material (e.g., glass) of the prisms 153, 154 to expand or contract, thus producing an additional change in thickness affecting a shift in the focal plane position. For the purpose of illustration, the prisms 153, 154 are modeled as a glass plate 400 having a thickness g. In the illustrated example, at the temperature T1, the focal plane of the lens 112 is at a distance D from the lens 112, and at the temperature T2, the focal plane of the lens 112 is at a distance (D+β) from the lens 112. A position of the focal plane is shifted by a distance of β as a result of temperature change from T1 to T2 due to expansion of the prisms 153, 154. The shift distance β of the focal plane as a result of the temperature change from T1 to T2 can be determined according to Equation (4):

$$\beta = g \cdot \left(1 - \frac{1}{n}\right) \cdot CTE_2 \cdot (T_2 - T_1) + \left(\frac{g}{n^2}\right) \cdot TOC_2 \cdot (T_2 - T_1), \quad (4)$$

where g is the combined thickness of the prisms 153, 154, $CTE_2$ is the coefficient of thermal expansion of the material of the prisms 153, 154, and $TOC_2$ is the thermo-optic coefficient of the prisms 153, 154.

Figure 5:
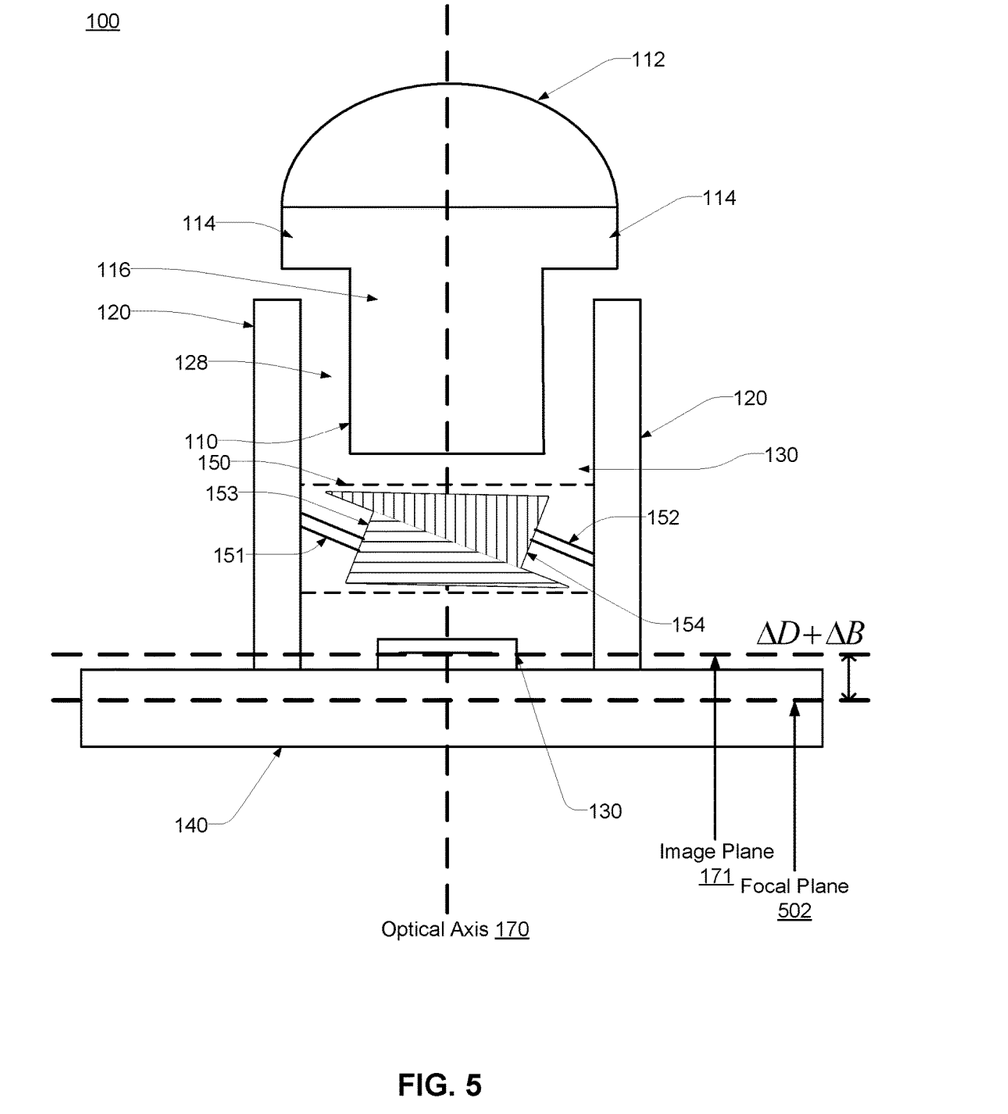
FIG. 5 illustrates a shift in focal plane position of an example integrated image sensor and lens assembly, according to one embodiment.

FIG. 5 illustrates a shift in focal plane position of an integrated image sensor and lens assembly 100. As illustrated, the lens barrel 110 and/or lens mount 120 may expand or contract in response to a change in temperature and may cause a shift in focal plane ΔB. The combined thickness of the prisms 153, 154 may also change in response to a change in temperature because the prisms 153, 154 may shift relative to each other due to expansion or contraction of the pushrods 151, 152. The combined thickness of the prisms 153, 154 may also change because of the thermal expansion or contraction of the prisms 153, 154. The total distance of the focal plane shift caused by the prisms 153, 154 may be determined according to Equation (5):

$$\Delta D = \phi + \beta = (CTE_1 \cdot L \cdot [T_2 - T_1] \cdot \sin\theta) \cdot \left(1 - \frac{1}{n}\right) + \quad (5)$$
$$g \cdot \left(1 - \frac{1}{n}\right) \cdot CTE_2 \cdot (T_2 - T_1) + \left(\frac{g}{n^2}\right) \cdot TOC_2 \cdot (T_2 - T_1).$$

In an embodiment, the geometry and material characteristics of the pushrods 151, 152 and prisms 153, 154 may be selected such that ΔD (i.e., the total distance of the focal plane shift caused by the prisms 153, 154) exactly or substantially compensates for ΔB (i.e., the shift in focal plane 502 caused by thermal expansion or contraction of the lens barrel 110 and/or the lens mount 120). That is, ΔD≈−ΔB. Thus, the optics compensator 150 operates to ensure that the the image plane 171 coincides with or substantially coincides with the focal plane 502.

In an alternative embodiment, a different form of optics compensator 150 that changes the focal plane position may be used to compensate for thermal expansion or contraction of the lens barrel 110 and/or lens mount 120. For example, in one embodiment, an active component (e.g., a motor) may be used to adjust the position of the prisms based on thermal feedback instead of the passively activated pushrods 151, 152. In another alternative embodiment, a glass piece of adjustable thickness may be used that is not necessarily a pair of prisms in the Babinet-Soleil configuration as described. In yet other embodiments, a similar optics compensator 150 may be used to intentionally shift the focal plane to achieve zoom effects.

Example Camera System Configuration

Figure 6:
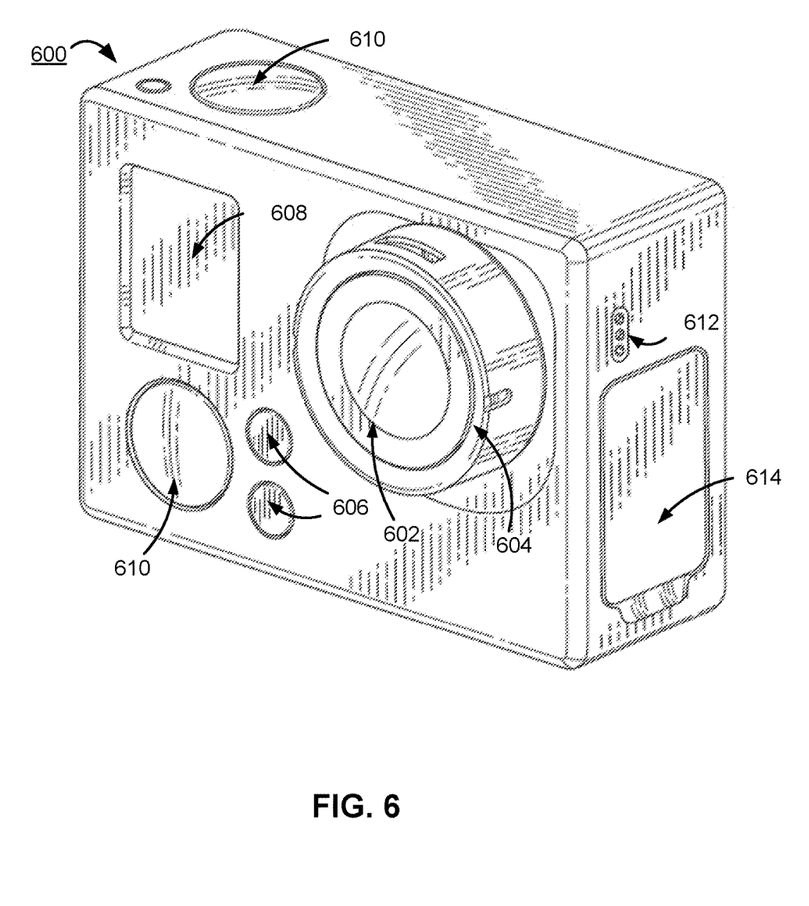
FIG. 6 illustrates an example camera that includes an integrated image sensor and lens assembly, according to one embodiment.

FIG. 6 illustrates an embodiment of an example camera 600 that includes the integrated image sensor and lens assembly 100 described above. The camera 600 comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera 600 is configured to capture images and video, and to store captured images and video for subsequent display or playback. As illustrated, the camera 600 includes a lens 602 configured to receive light incident upon the lens and to direct received light onto an image sensor internal to the lens. The lens 602 is enclosed by a lens ring 604, which are both part of the integrated image sensor and lens assembly 100 discussed above.

The camera 600 can include various indicators, including the LED lights 606 and the LED display 608. The camera 600 can also include buttons 610 configured to allow a user of the camera to interact with the camera, to turn the camera on, and to otherwise configure the operating mode of the camera. The camera 600 can also include a microphone 612 configured to receive and record audio signals in conjunction with recording video. The side of the camera 600 includes an I/O interface 614.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An integrated sensor and lens assembly, comprising:
   an image sensor;
   a lens mount coupled to the image sensor;
   a lens barrel secured by the lens mount, the lens barrel comprising a first material that expands or contracts in response to a temperature change according to a first coefficient of thermal expansion, wherein expansion or contraction of the lens barrel causes a first shift in a focal plane in a first direction along an optical axis substantially perpendicular to the focal plane; and
   at least two optical components intersecting the optical axis, the at least two optical components comprising a second material that expands or contracts in response to the temperature change according to a second coefficient of thermal expansion to cause a first change in combined thickness of the at least two optical components along the optical axis;
   multiple passively actuating elements coupled between the lens mount and the at least two optical components, the multiple passively actuating elements comprising a third material that expands or contracts in response to the temperature change according to a third coefficient of thermal expansion, wherein expansion or contraction of the multiple passively actuating elements causes a second change in combined thickness of the at least two optical components along the optical axis; and
   wherein the second material, third material, and geometry of the at least two optical components are configured such that the first change in combined thickness and the second change in combined thickness of the at least two optical components cause a second shift in the focal plane in a second direction along the optical axis opposite the first direction.

2. The integrated sensor and lens assembly of claim 1, wherein a magnitude of the first shift is approximately equal to the magnitude of the second shift.

3. The integrated sensor and lens assembly of claim 1, wherein the at least two optical components are configured such that first, second, and third surfaces of a first optical component are parallel to first, second, and third surfaces of a second optical component, respectively.

4. The integrated sensor and lens assembly of claim 3, wherein the third surface of the first optical component contacts or is in close proximity to the third surface of the second optical component.

5. The integrated image sensor and lens assembly of claim 4, wherein the at least two optical components are configured as a Babinet-Soleil compensator.

6. The integrated sensor and lens assembly of claim 3, wherein the passively actuating elements are configured to, responsive to temperature change, cause the at least two optical components to move in a direction that the at least two optical components are configured to move relative to each other.

7. The integrated sensor and lens assembly of claim 5, wherein the direction is parallel to or substantially parallel to the third surfaces of the first and second prisms.

8. An integrated image sensor and lens assembly comprising:
   an image sensor substrate comprising an image sensor in an image plane;
   a lens mount coupled to the image sensor substrate;
   an optics compensator including an optical component to refract light from a camera lens window to cause a change in position of a focal plane based on a thickness of the optical component, and one or more passively actuating elements to couple the optical component to the lens mount and to cause a change in the thickness of the optical component in response to a temperature change,
   wherein the optics compensator is configured to maintain the focal plane to coincide with or substantially coincide with the image plane.

9. The integrated image sensor and lens assembly of claim 8, further comprising a lens barrel having the camera lens window, wherein a coefficient of thermal expansion of the lens barrel is the same or is substantially the same as a coefficient of thermal expansion of the one or more passively actuating elements.

10. The integrated image sensor and lens assembly of claim 8, wherein the one or more passively actuating elements comprise a pushrod.

11. The integrated image sensor and lens assembly of claim 8, wherein the optics compensator comprises a set of prisms, and the one or more passively actuating elements couple each prism of the set of prisms to an inner surface of the lens mount.

12. The integrated image sensor and lens assembly of claim 11, wherein the set of prisms is configured such that first, second, and third surfaces of a first prism are parallel to first, second, and third surfaces of a second prism, respectively.

13. The integrated image sensor and lens assembly of claim 12, wherein the third surface of the first prism contacts or is in close proximity to the third surface of the second prism.

14. The integrated image sensor and lens assembly of claim 13, wherein the set of prisms is configured as a Babinet-Soleil compensator.

15. The integrated image sensor and lens assembly of claim 11, wherein responsive to a temperature change, the one or more passively actuating elements cause the set of prims to move relative to each other.

16. A camera, comprising:
 a camera body, the camera body housing an integrated sensor and lens assembly; and
 the integrated sensor and lens assembly, comprising:
  an image sensor substrate comprising an image sensor in an image plane;
  a lens mount coupled to the image sensor substrate;
  an optics compensator including an optical component to refract light from a camera lens window to cause a change in position of a focal plane based on a thickness of the optical component, and one or more passively actuating elements to couple the optical component to the lens mount and to cause a change in the thickness of the optical component in response to a temperature change,
  wherein the optics compensator is configured to maintain the focal plane to coincide with or substantially coincide with the image plane.

17. The camera of claim 16, wherein the integrated sensor and lens assembly further comprises a lens barrel having the camera lens window, and wherein a coefficient of thermal expansion of the lens barrel is the same or is substantially the same as a coefficient of thermal expansion of the one or more passively actuating elements.

18. The camera of claim 16, wherein the optics compensator comprises a set of prisms, and the one or more passively actuating elements couple each prism of the set of prisms to an inner surface of the lens mount.

19. The camera of claim 18, wherein the set of prisms is configured as a Babinet-Soleil compensator.

20. The camera of claim 18, wherein responsive to a temperature change, the one or more passively actuating elements cause the set of prims to move relative to each other.

* * * * *